United States Patent
Mehringer (10) Patent No.: US 10,075,011 B2
(45) Date of Patent: Sep. 11, 2018

(54) METHOD FOR OPERATING AN ACTIVE CONVERTER CONNECTED TO AN ELECTRIC MACHINE AND MEANS FOR THE IMPLEMENTATION THEREOF

(71) Applicant: Robert Bosch GmbH, Stuttgart (DE)

(72) Inventor: Paul Mehringer, Stuttgart (DE)

(73) Assignee: SEG AUTOMOTIVE GERMANY GMBH, Stuttgart (DE)

( * ) Notice: Subject to any disclaimer, the term of this patent is extended or adjusted under 35 U.S.C. 154(b) by 0 days.

(21) Appl. No.: 15/547,356

(22) PCT Filed: Jan. 21, 2016

(86) PCT No.: PCT/EP2016/051214
§ 371 (c)(1),
(2) Date: Jul. 28, 2017

(87) PCT Pub. No.: WO2016/128194
PCT Pub. Date: Aug. 18, 2016

(65) Prior Publication Data
US 2018/0026473 A1    Jan. 25, 2018

(30) Foreign Application Priority Data
Feb. 11, 2015    (DE) .................... 10 2015 202 440

(51) Int. Cl.
*H02J 7/14*     (2006.01)
*H02P 29/024*   (2016.01)
(Continued)

(52) U.S. Cl.
CPC ............. *H02J 7/1438* (2013.01); *H02H 7/12* (2013.01); *H02P 9/102* (2013.01); *H02P 9/48* (2013.01); *H02P 29/0241* (2016.02)

(58) Field of Classification Search
CPC .... H02J 7/1438; H02P 29/0241; H02P 9/102; H02P 9/48; H02H 7/12
(Continued)

(56) References Cited

U.S. PATENT DOCUMENTS 9,478,987 B2 * 10/2016 Nelson ...................... H02J 3/24
9,692,226 B2 *  6/2017 Davidson ............... H02H 3/087
(Continued)

FOREIGN PATENT DOCUMENTS

DE    102006047243 A1    11/2007
DE    102011006316 A1    10/2012
DE    102013213802 A1     1/2015

OTHER PUBLICATIONS

International Search Report for PCT/EP2016/051214, dated May 11, 2016.

*Primary Examiner* — Viet Nguyen
(74) *Attorney, Agent, or Firm* — Norton Rose Fulbright US LLP; Gerard A. Messina (57) ABSTRACT

An active converter connected to an electric machine, including arresting circuits to activate a voltage arresting function from a first point-in-time, and which is configured to only activate a load dump reaction upon activation conditions from a second point-in-time, the activation conditions include that it is determined that at the second point-in-time, a supply-side voltage potential applied to an exciter winding of the electric machine is between the voltage potential applied at the first DC voltage terminal and a ground potential, if the exciter winding is disconnected from the voltage potential of the vehicle electrical system voltage and/or a current flowing through the exciter winding is below a current threshold value and/or after an initial activation of a load dump reaction, after which further load dump reactions were activated, more than a predefined (Continued)

period of time has elapsed and/or more than a predefined number of load dump reactions were activated.

10 Claims, 8 Drawing Sheets

(51) Int. Cl.
  *H02H 7/12* (2006.01)
  *H02P 9/48* (2006.01)
  *H02P 9/10* (2006.01)
(58) Field of Classification Search
  USPC .......................................................... 322/69
  See application file for complete search history.

(56) References Cited

U.S. PATENT DOCUMENTS

| | | | |
|---|---|---|---|
| 2013/0113212 A1* | 5/2013 | Sakamoto | H02P 9/48 290/44 |
| 2014/0343739 A1 | 11/2014 | Masson et al. | |
| 2016/0204723 A1* | 7/2016 | Brady | H02P 9/04 322/28 |
| 2017/0133971 A1* | 5/2017 | Huang | H02P 29/0241 |
| 2018/0041025 A1* | 2/2018 | Mehringer | H02H 7/1252 |

\* cited by examiner

METHOD FOR OPERATING AN ACTIVE CONVERTER CONNECTED TO AN ELECTRIC MACHINE AND MEANS FOR THE IMPLEMENTATION THEREOF

FIELD OF THE INVENTION

The present invention relates to a method for operating an active converter connected to an electric machine and an arrangement for implementing this method according to the respective definitions of the species in the independent patent claims.

BACKGROUND INFORMATION

Converters of different types which are operated as rectifiers may be used for supplying direct current systems from three-phase current sources, in particular motor vehicle electrical systems by way of three-phase generators. In motor vehicle electrical systems, in accordance with the three-phase, four-phase, or five-phase generators typically installed here, converters in six-pulse, eight-pulse, or ten-pulse designs are typically used. The present invention is also suitable for converters for other numbers of phases or pulses, however.

When reference is made hereafter to a generator, for the sake of simplicity, this may also be an electric machine operable as a generator and a motor in this case, for example, a so-called starter generator. A converter is understood hereafter as a bridge circuit of a known type, which operates as a rectifier in the case of generator operation of the electric machine. For the sake of simplicity, also referred to hereafter as a rectifier. An arrangement made up of at least one electric machine operable as a generator and a corresponding converter operating as a rectifier is also referred to hereafter as a power supply device.

A critical operating case with corresponding power supply devices is the so-called load dump. This occurs if, in the case of a highly energized electric machine and a correspondingly high emitted current, the load on the electric machine or the converter suddenly decreases. A load dump may result from a shutdown of consumers in the connected motor vehicle electrical system or from a cable breakage.

If consumers are suddenly shut down in a motor vehicle electrical system, in particular during battery-free operation, due to the inductance of the exciter winding and the exciter field, which therefore only dissipates slowly, the electric machine may still supply more energy for up to a second than the motor vehicle electrical system is able to absorb. If this energy cannot be absorbed or cannot be absorbed completely by capacitive elements in the motor vehicle electrical system or in the converter, overvoltages and overvoltage damage may occur in components in the motor vehicle electrical system.

In the event of a cable breakage, by which the motor vehicle electrical system is disconnected from the converter, the electric machine also continues to supply energy, but a consumer is no longer connected. In comparison to the case just explained of the shutdown of consumers, consumers are therefore no longer at risk. The consumers may also still be supplied by the battery. However, the power electronics of the electric machine or the converter may be damaged in such cases by overvoltages.

In conventional (passive) converters, a certain protection of the vehicle electrical system or the power electronics of the electric machine and the converter takes place due to the converter itself, namely with the aid of the Zener diodes classically installed therein, in which the overvoltage is arrested and excess energy is converted into heat. The use of additional arresting elements is also known in this context.

However, the use of active or controlled converters is desirable in motor vehicles, inter alia, because active converters, in contrast to passive or uncontrolled converters, have low power losses during normal operation. Presently available activatable or active current control valves for active converters, for example, field-effect transistors, do not have an integrated arresting function with sufficient robustness such as conventional Zener diodes, however, and therefore cannot absorb the overvoltage. Additional protective strategies are therefore absolutely necessary in active converters.

In the event of a load dump, for example, the generator phases may be short-circuited, by briefly switching some or all current control valves of the upper or lower branch of a corresponding converter to be conductive. This is carried out in particular on the basis of an evaluation of the vehicle electrical system voltage applied at the DC voltage terminals of the converter. If this voltage exceeds a predefined upper threshold value, a corresponding short-circuit is initiated and the vehicle electrical system voltage drops. If the vehicle electrical system voltage then falls below a predefined lower threshold value, the short-circuit is canceled and the vehicle electrical system voltage increases again. The vehicle electrical system voltage therefore swings between the upper and the lower threshold values until the exciter field has abated.

An electric machine having an (at least largely) abated exciter field is also referred to hereafter as "de-energized"; an electric machine having an exciter field which is not or is only slightly abated is referred to as "energized". When reference is made hereafter to a "phase short-circuit is initiated", this is understood to mean that, as explained, the current control valves of the upper or the lower branch of a converter are switched to be conductive. A corresponding phase short-circuit is "canceled" when the regular active rectification is resumed again, for example, using the known pulse width modulation activation or block activation.

In the explained methods, a continuous alternation, which may no longer be ended in a conventional manner, between active rectification and phase short-circuits may take place. Since capacitively acting elements in the vehicle electrical system are no longer available in the event of a cable breakage and the capacitive elements present in the converter are comparatively small, small amounts of energy are sufficient to raise the vehicle electrical system voltage (of the remaining network which is not disconnected by the cable breakage) again in such a way that the threshold value used to initiate the phase short-circuits is exceeded. The method therefore no longer comes "to rest", i.e., it does not enter the permanently active rectification or only does so very late. This problem is also explained below with reference to the figures.

Converters in which, in addition to an arrangement for activating a corresponding load dump reaction in the form of phase short-circuits, a voltage arresting function is provided, are also affected by this problem. Corresponding arresting circuits are configured to absorb voltage peaks before a load dump reaction in the form of phase short-circuits may be activated. A voltage arresting function induced by the arresting circuits is activated from a point in time from which the vehicle electrical system voltage or a corresponding voltage potential rises to a predefined threshold value, and is kept activated as long as the voltage potential does not drop below the threshold value. Due to the arrest, the vehicle electrical system voltage no longer increases above the threshold value, which is defined as at least temporarily safe. Such a voltage arresting function in converters, in which phase short-circuits are also used, typically includes activating the current control valves in the branches of the converter not used for the phase short-circuits and therefore establishing a conductive connection between the phase terminals connected to these current control valves and the corresponding DC voltage terminal.

The approaches known from the related art have proven, as mentioned, to not always be advantageous in particular in the event of cable breakages, so that the demand for an improved protective strategy exists for such cases.

SUMMARY OF THE INVENTION

According to the present invention, a method for operating an active converter connected to an electric machine and an arrangement for implementing this method are provided according to the respective definitions of the species in the independent patent claims. Specific embodiments are the subject matter of the dependent patent claims and the following description.

An aspect of the present invention is to determine whether, in the cases of a load dump due to a cable breakage as explained at the outset, a further activation of a load dump reaction in the form of phase short-circuits is necessary or whether it may be ended. As noted, in the explained methods, a continuous alternation which may no longer be ended in a conventional manner between active rectification and phase short-circuits may occur solely due to the effects of the small remaining capacitances, even if the electric machine used is already (largely) de-energized.

Within the scope of the present invention, options are shown which enable cases to be recognized in which the electric machine is already de-energized or largely de-energized and therefore no further activation of phase short-circuits is necessary. The present invention enables the regular rectification to be entered rapidly or even at all in this way and the repeated cycles of regular rectification and phase short-circuits to be ended. This results in advantageous operation of a corresponding vehicle electrical system even after a cable breakage.

The present invention provides a method here for operating an active converter connected to an electric machine. In the converter, as is known in this respect, a number of phase terminals are each connected via an activatable current control valve in a first converter branch to a first DC voltage terminal and via an activatable current control valve in a second converter branch to a second DC voltage terminal. An "activatable current control valve" within the scope of the present application is a (power) transistor, in particular a metal oxide field-effect transistor, of a known type. A "first converter branch" includes the entirety of the current control valves connected to the first DC voltage terminal; a "second converter branch" includes the entirety of the current control valves connected to the second DC voltage terminal. For example, if a positive battery terminal is connected to the first DC voltage terminal and the second DC voltage terminal is connected to a negative battery terminal or ground, the first converter branch is the "high-side" or "upper" branch of the converter and the second converter branch is the "low-side" or "lower" branch of the converter. Exactly two converter branches are always provided.

Each of the current control valves of one of the two converter branches is provided with an arresting circuit, which is configured to activate a voltage arresting function from a first point in time, from which a voltage potential applied to the first DC voltage terminal or a voltage applied between the first and the second DC voltage terminals, i.e., a vehicle electrical system voltage, increases to a predefined first threshold value, and to keep the voltage arresting function activated as long as the voltage potential does not drop below the first threshold value. The voltage arresting function includes activating the current control valve provided with the arresting circuit and therefore establishing a conductive connection between the phase terminal connected to the current control valve and the particular DC voltage terminal.

The converter is furthermore configured to only activate a load dump reaction if activation conditions are additionally present from a second point in time, if the voltage potential is above a second threshold value at the second point in time. The second point in time is after the first point in time and the second threshold value is below the first threshold value. The load dump reaction includes activating all current control valves of the other of the two converter branches and therefore establishing a conductive connection between all phase terminals. The first point in time is determined by the point in time of reaching the first threshold value by the vehicle electrical system voltage, i.e., the mentioned voltage potential, and corresponds to the point in time at which an arresting function is activated. The second point in time may be a predefined period of time (dead time) after the first point in time, for example, 50 μs. An arresting function does not have to be activated continuously within this period of time between the first and the second periods of time, in particular not if the vehicle electrical system voltage already drops below the first threshold value again after a very short time.

The voltage arrest thus takes place in the branch of the converter which is not used for the phase short-circuits and vice versa. Thus, if the phase short-circuits are induced in the lower branch of the converter ("low-side"), the voltage arrest takes place in the upper branch of the converter ("high-side") and vice versa. The "first" DC voltage terminal typically corresponds to a positive battery terminal and the "second" DC voltage terminal corresponds to a negative battery terminal or ground.

According to the present invention, the activation conditions for activating the load dump reaction include determining that at the second point in time, a supply-side voltage potential applied to an exciter winding of the electric machine is between the voltage potential applied at the first DC voltage terminal and a ground potential, if the exciter winding is disconnected from the voltage potential of the vehicle electrical system voltage, and/or a current flowing through the exciter winding is below a current threshold value, and/or after an initial activation of a load dump reaction, after which further load dump reactions were activated, more than a predefined period of time has elapsed and/or more than a predefined number of load dump reactions were activated.

All mentioned criteria may be determined in a controller of an electric separately excited synchronous machine, for example, a claw pole generator, or on the basis of characteristic variables of a corresponding controller itself. Resorting to values ascertained in an active converter, for example, is not necessary.

Figure 2:
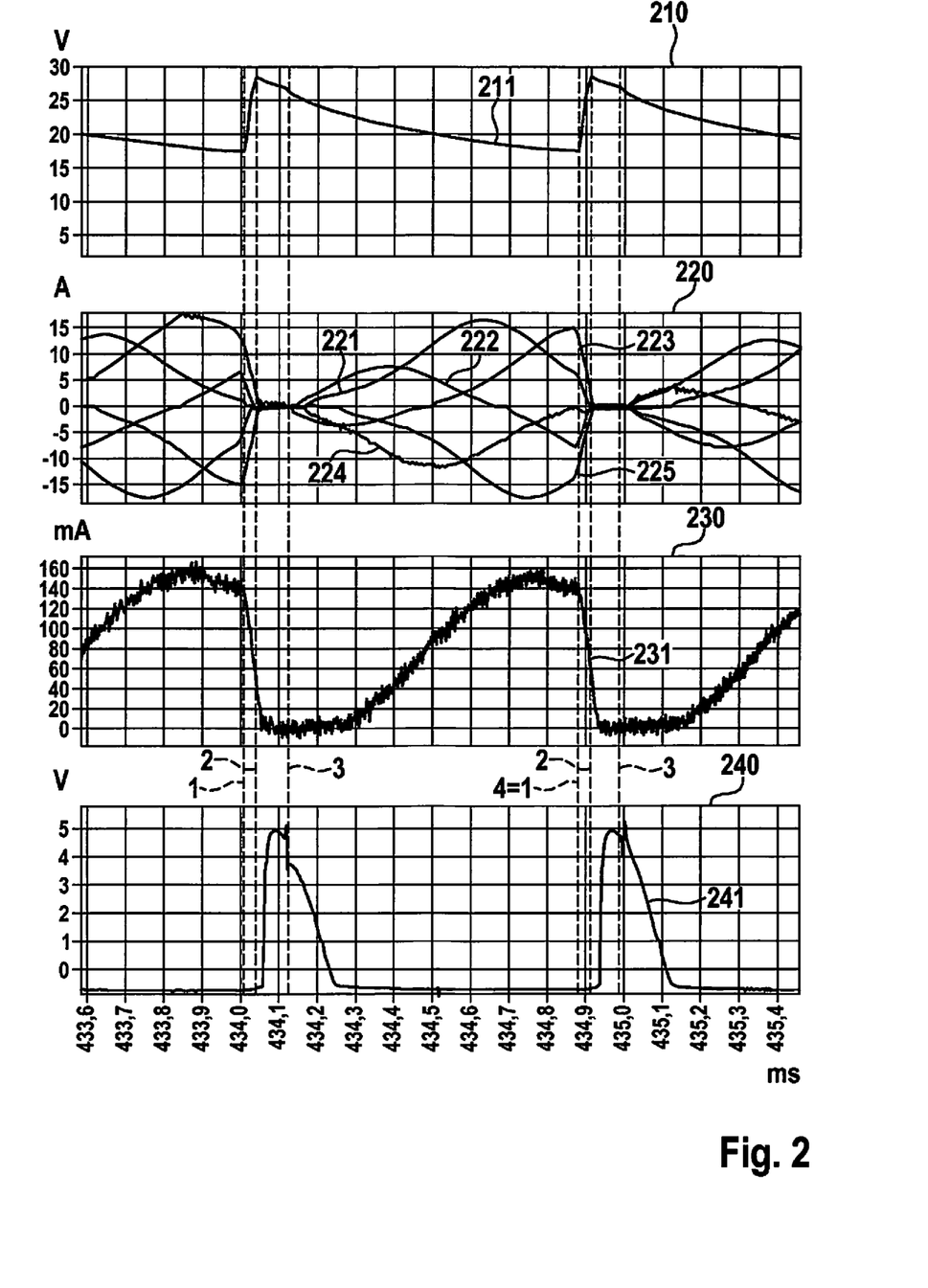
FIG. 2 illustrates current and voltage curves during a load dump reaction in the case of cable breakage and a de-energized electric machine.
Figure 3:
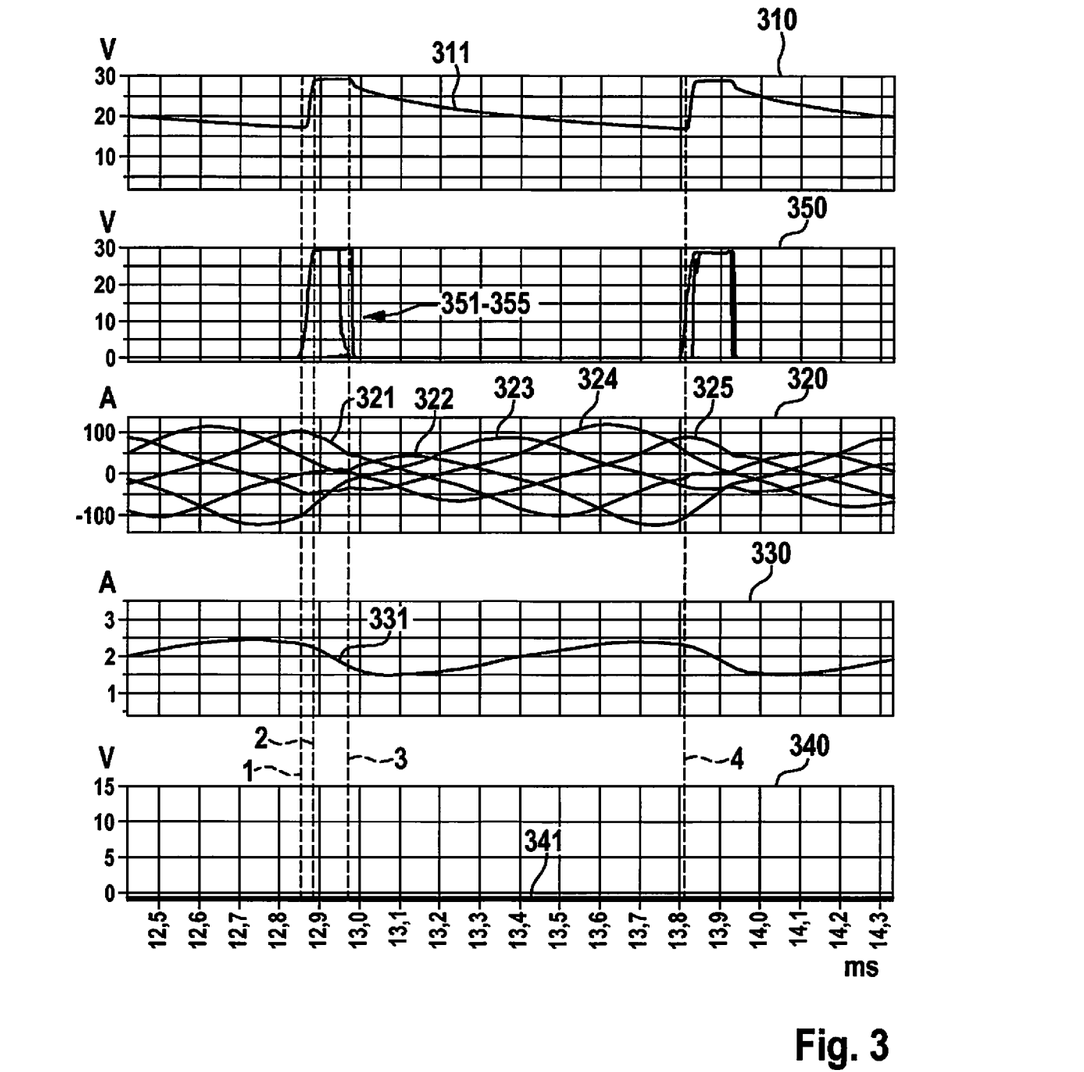
FIG. 3 illustrates current and voltage curves during a load dump reaction in the case of cable breakage and an energized electric machine.
Figure 4:
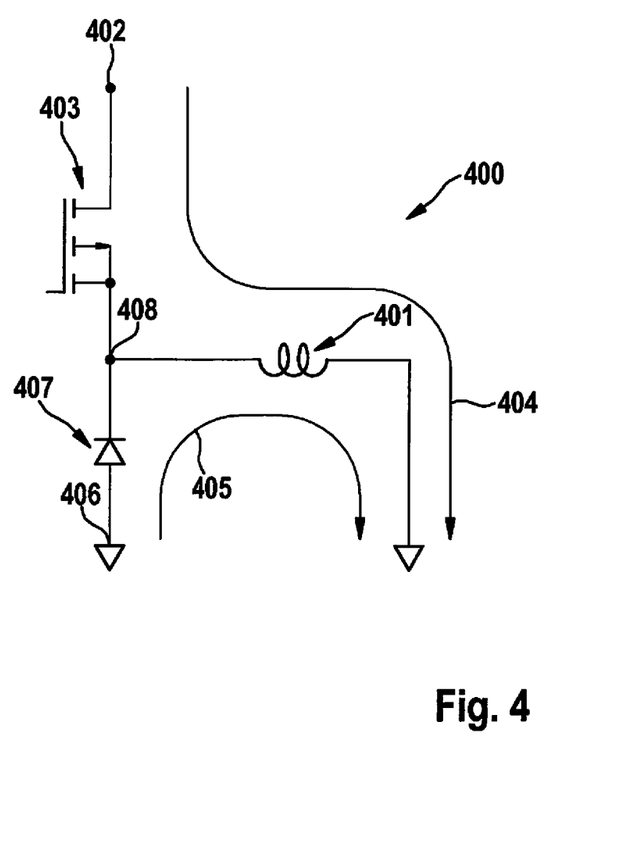
FIG. 4 illustrates the schematic structure of a voltage regulator of an electric machine in a schematic view.

As explained in particular with reference to FIGS. 2, 3, and 4, if a supply-side voltage potential applied to the exciter winding of the electric machine is between the voltage potential applied to the first DC voltage terminal and a ground potential, and if the exciter winding is disconnected from the voltage potential of the vehicle electrical system voltage, it may be presumed that an electric machine is sufficiently de-energized. This is accordingly true if the current flowing through the exciter winding is below a current threshold value. If more than a predefined period of time has elapsed and/or more than a predefined number of load dump reactions were activated after an initial activation of a load dump reaction, after which further load dump reactions were activated, sufficient de-energizing of the electric machine may also be reliably presumed due to the elapsed time.

A generator regulator (also referred to hereafter as a "voltage regulator" or as a "regulator" in short) is advantageously used in the method, in which an exciter winding is connected via an activatable current control valve ("supply-side") to the DC voltage terminal. The exciter winding is connected at the other end to ground, for example. The "supply-side" potential also refers to the voltage potential which is applied at the mentioned current control valve or valves on the side ("winding side") with which the current control valve is connected to the exciter winding, also and in particular if the exciter winding is disconnected from the potential of the first DC voltage terminal because the at least one current control valve is not activated.

In this case, the determination at the second point in time that the supply-side voltage potential applied to the exciter winding of the electric machine is between the voltage potential applied at the first DC voltage terminal and a ground potential, if the exciter winding is disconnected from the voltage potential of the vehicle electrical system voltage, therefore advantageously also includes the detection of an activation state of the current control valve, via which the exciter winding is connected to the DC voltage terminal. If it is determined that the current control valve via which the exciter winding is connected to the DC voltage terminal is not activated, and if the supply-side voltage potential applied to the exciter winding of the electric machine is at a positive value, it may be presumed, as is also explained hereafter with reference to FIG. 4, that the electric machine is completely de-energized. The voltage potential is achieved in this case by overcoupling into the electric machine, which is only possible if the current flowing through field coil 401 from FIG. 4 is already completely abated. Otherwise, the supply-side potential is connected by a current flow through diode 407 to the ground potential.

In a corresponding method, the determination that the current flowing through the exciter winding is below a current threshold value includes the measurement of the current with the aid of a current measuring device (for example, a shunt) and the comparison to the current threshold value. Corresponding current measuring devices may already be present in conventional generator regulators and therefore may be used further. The current threshold value is advantageously determined on the basis of a speed and in consideration of thermal and/or electrical properties of the electric machine, so that a corresponding electric machine or the converter is always operationally reliable.

It is particularly advantageous if the determination at the second point in time of whether more than a predefined period of time has elapsed after the initial activation of a load dump reaction, after which further load dump reactions were activated, furthermore includes specifying a minimum and/or maximum number of activations of load dump reactions and/or a minimum and/or maximum time interval between successive activations of load dump reactions and only determining that more than a predefined period of time has elapsed after the initial activation of a load dump reaction, after which further load dump reactions were activated, if at least one of these provided specifications is fulfilled. In this way, for example, two repeatedly regularly initiated and canceled series of load dump reactions, for example, due to shutdowns of consumers, are prevented from erroneously being taken for a single series of load dump reactions which may not be canceled. A period of time usable in all cases may be, for example, 100 ms to 400 ms.

In a corresponding way, it may also be advantageous if the predefined number of load dump reactions is predefined on the basis of a number of load dump reactions determined in the event of a load dump due to a shutdown of a consumer. A safety factor may be added to this number. The series of load dump reactions is only considered to be a reaction to a cable breakage when this number resulting therefrom is exceeded, and it is presumed that it may no longer be ended in a regular way, as already explained above.

In certain cases, it may prove to be advantageous if a counter is used, which counts a number of load dump reactions at least during a predefined period of time. If the number thus ascertained and/or a corresponding frequency is above a predefined threshold value, a sufficiently de-energized machine may be reliably presumed.

A processing unit according to the present invention, for example, a control unit of a power supply device or an active converter, is configured, in particular by programming, to carry out a method according to the present invention.

The implementation of the method in the form of software is also advantageous, since this entails particularly low costs, in particular if an executing control unit is also used for further tasks and is therefore present in any case. Suitable data carriers for providing the computer program are in particular diskettes, hard drives, flash memories, EEPROMs, CD-ROMs, DVDs, etc. A download of a program via computer networks (Internet, intranet, etc.) is also possible.

Further advantages and embodiments of the present invention result from the description and the appended drawings. The present invention is schematically shown on the basis of exemplary embodiments in the drawings and will be described hereafter with reference to the drawings.

DETAILED DESCRIPTION

Figure 1:
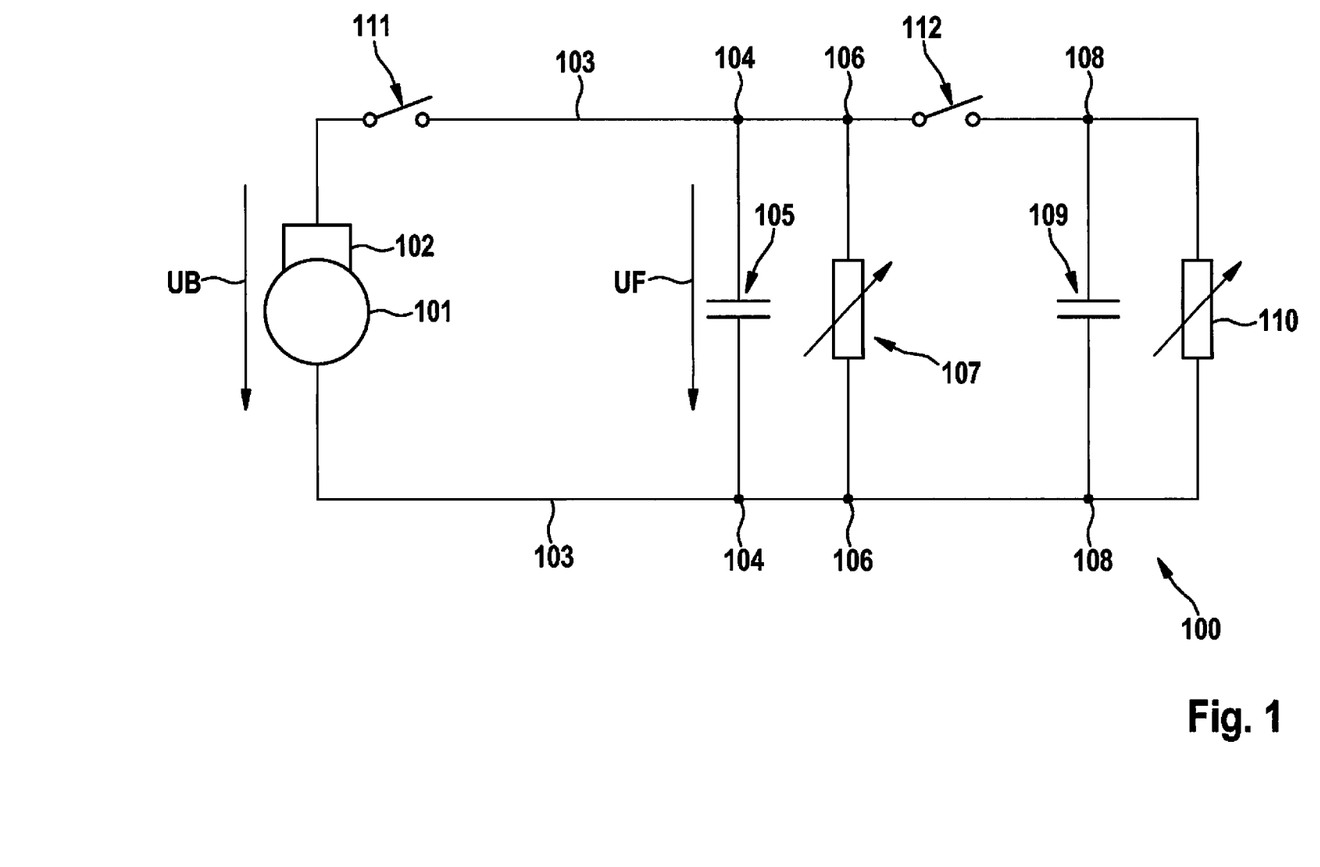
FIG. 1 illustrates load dump events on the basis of a simplified equivalent circuit diagram of a motor vehicle electrical system.

Different load dump events are illustrated in FIG. 1 on the basis of an equivalent circuit diagram 100 of a motor vehicle electrical system.

Figure 6:
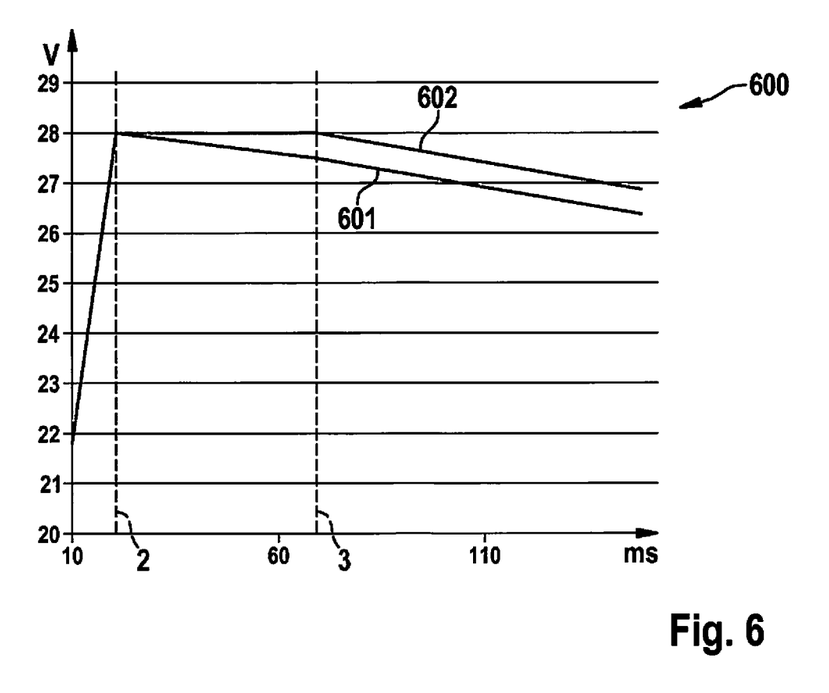
FIG. 6 illustrates a voltage curve of a vehicle electrical system voltage during and after the activation of an arresting function in a detailed view.

Equivalent circuit diagram 100 represents an electric machine 101, which operates as a generator, including an associated active converter 102. Reference is made to FIG. 6 with respect to details. Electric machine 101 and converter 102 are each connected via cables 103, having 1.5 m length each and a cross section of 25 mm² each, for example, to switching points 104. A capacitor 105 is connected between switching points 104, as is provided, for example, at a jump start supporting point of a vehicle. Switching points 104 are provided in a real vehicle electrical system for jump starting of the motor vehicle. A resistive load 107 is symbolically shown between further switching points 106. A further capacitor 109, which shows a vehicle electrical system capacitance, is incorporated between still further switching points 108, between which a further resistive load 110 is also symbolically shown.

Switches 111 and 112 are not present in a real vehicle electrical system and illustrate the states occurring in the event of a load dump, as explained hereafter. The normal operation of a corresponding vehicle electrical system, i.e., without load dump, corresponds to a closed (conductive) state of switches 111 and 112. A voltage UB, as shown by a correspondingly inscribed arrow, is applied at electric machine 101 and converter 102. Voltage UB is referred to hereafter as the vehicle electrical system voltage. The vehicle electrical system voltage is applied at the DC-voltage-side outputs of converter 102, one of these outlets also being able to be at ground. In this case, the vehicle electrical system voltage results as the potential difference between ground and the other DC-voltage-side output of converter 102. The voltage which drops over capacitor 107 is also shown by an arrow and is identified by UF.

The state without load dump corresponds, as mentioned, to a closed state of switches 111 and 112. Electric machine 101 emits a current via converter 102 to the vehicle electrical system illustrated in FIG. 1, which results from the load resistances of resistive loads 107 and 110. A load dump may be illustrated by the opening of one of switches 111 and 112. The opening of switch 111 corresponds to a cable breakage at converter 102. The opening of switch 112, in contrast, simulates a load dump as is caused by the shutdown of resistive load 110 in the vehicle electrical system. The level of the dumped load current is directed in the latter case, i.e., a load shutdown, to the load resistance of the dumped resistive load 110, and the level of the remaining vehicle electrical system current is directed to the load resistance of resistive load 107.

FIG. 2 shows current and voltage curves in four diagrams 210 through 240 in volts or amps or milliamps on the particular ordinate over a shared time axis in milliseconds on the abscissa. Three characteristic points in time in diagrams 210 through 240 are identified throughout the diagrams with 1 through 4. Diagrams 210 through 240 relate to the case of a cable breakage (corresponding to opening of switch 111 according to preceding FIG. 1) with (largely) abated energizing current in an electric machine operating as a generator, for example, electric machine 101 according to FIG. 1. This is assumed hereafter to be a five-phase electric machine. As mentioned, however, the present invention is also suitable for electric machines having other numbers of phases.

Diagram 210 illustrates curve 211 of the vehicle electrical system voltage, for example, voltage UB according to FIG. 1. Diagram 220 illustrates curves 221 through 225 of the phase currents of the electric machine, which is assumed to be five-phase here, as mentioned. Curve 231, which moves here in the milliamp range, of the field current through the exciter winding of the electric machine is shown in diagram 230; diagram 240 shows a curve 241 of a voltage applied at the exciter winding. Reference is made in addition to FIG. 4 explained below for the further explanation of diagrams 230 and 240 or curves 231 and 241.

During the entire period of time which is shown in diagrams 210 through 240, a load dump as a result of a cable breakage exists. At point in time 1, for example, due to a drop of the vehicle electrical system voltage considered to be sufficient, illustrated by curve 211 in diagram 210, it is decided that a phase short-circuit may be ended. A phase short-circuit thus still exists before point in time 1.

Figure 5:
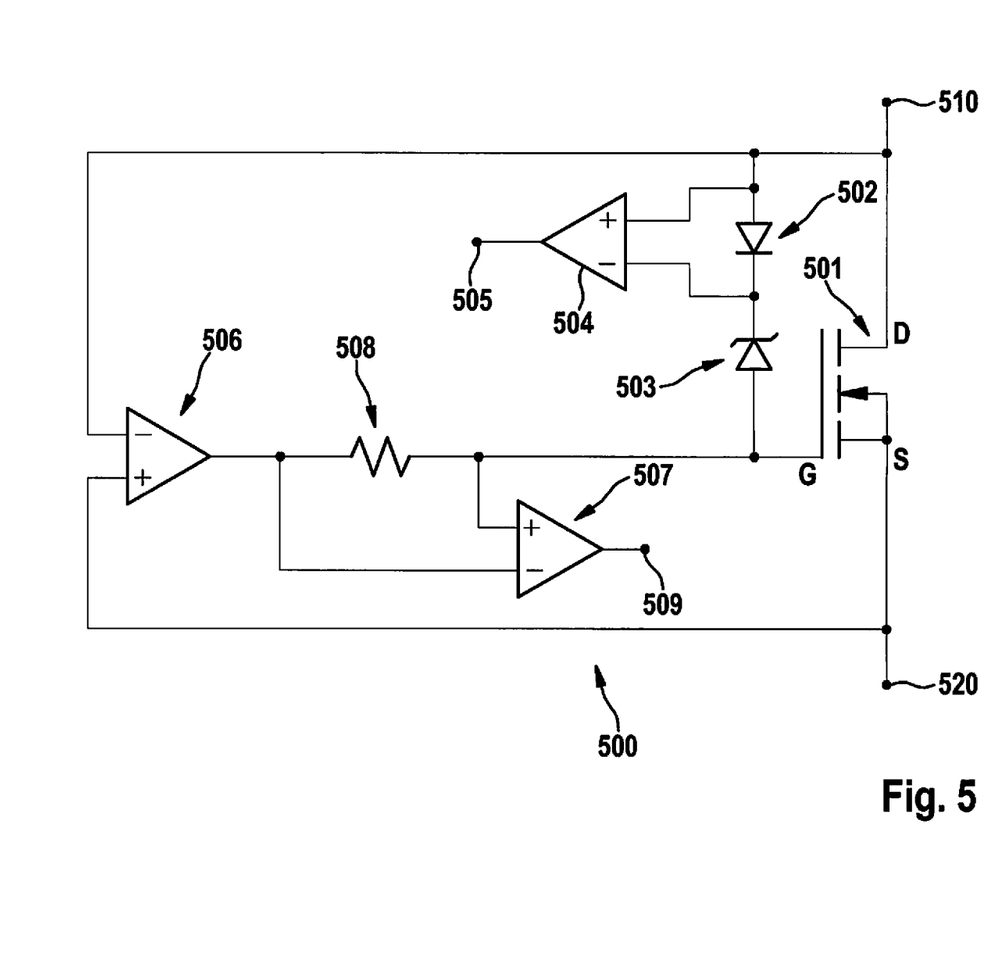
FIG. 5 illustrates an additional circuit of a current control valve of an active converter in a schematic view.

From point in time 1, regular rectification is entered. Initially, a corresponding capacitance of, for example, 1 µF to 100 µF, for example, a capacitor which is located in rectifier 102 or in regulator 400 according to FIG. 1 between terminals B+ and B−, is charged. Due to the comparatively low capacitance and the high generator currents, the charging takes place very rapidly. At point in time 2, at which the vehicle electrical system voltage, illustrated by curve 211 in diagram 210, exceeds a threshold value (trigger threshold) (referred to previously within the scope of this application and in the patent claims as the "first" point in time), an arresting function of this voltage in the converter therefore becomes active. Reference is made to FIG. 5 explained below with respect to details of such an arresting function. It is apparent that between points in time 2 and 3, due to this measure, the phase currents, illustrated by curves 221 through 225 in diagram 220 and the field current, illustrated by curve 231 in diagram 230, already return to the value zero. This represents, as is apparent in comparison to FIG. 3, a characteristic in a (largely) de-energized electric machine.

The vehicle electrical system voltage, illustrated by curve 211 in diagram 210, also drops, which represents a further characteristic in a (largely) de-energized electric machine, as is apparent in comparison to FIG. 3. Because the vehicle electrical system voltage is still above a threshold value defined for initiating phase short-circuits, however (referred to within the scope of this application previously and in the patent claims as the "second" threshold value), at point in time (referred to within the scope of this application previously and in the patent claims as the "second" point in time), a phase short-circuit is triggered. In the period of time between points in time 3 and 4 (after the "second" point in time), the vehicle electrical system voltage is dissipated due to the power consumption of the converter and the regulator thereof during the phase short-circuit. Since the electric machine does not experience a counter voltage during the phase short-circuit, the voltages induced due to the residual remanence are sufficient to induce phase currents, as is apparent on the basis of curves 221 through 225 of diagram 220. These phase currents are even overcoupled onto the exciter circuit, as is recognizable in diagram 230 on the basis of curve 231 of the field current.

At point in time 4, the phase short-circuit is disengaged again. The energy buffered in the phase currents is sufficient in the case of the low existing capacitance to raise the vehicle electrical system voltage again, visible in curve 211 of diagram 210, back to a value which is above the trigger threshold, which in turn results in the activation of the phase short-circuit. The loop according to FIG. 2 begins from the start. It is recognizable that even with the (largely) de-energized electric machine, it is not possible to exit a corresponding loop conventionally.

FIG. 3 shows current and voltage curves in five diagrams 310 through 350 in volts or amps or milliamps on the particular ordinate over a shared time axis in milliseconds (abscissa). The characteristic points in time in diagrams 310 through 350 are also identified here throughout the diagrams with 1 through 4. Diagrams 310 through 350 relate to the case of a cable breakage (corresponding to an opening of switch 111 according to preceding FIG. 1) with (hardly) abated field current in an electric machine operating as a generator, for example, electric machine 101 according to FIG. 1. This is also assumed here to be a five-phase electric machine. As mentioned, however, the present invention is also suitable for electric machines having other numbers of phases.

Curves 311 through 341 illustrated in diagrams 310 through 340 of FIG. 3 each correspond in their origin to curves 211 through 241 illustrated in diagrams 210 through 240 and are accordingly indicated using reference numerals incremented by 100. In addition, curves 351 through 355 of phase voltages of the electric machine are shown in diagram 350.

During the entire period of time which is illustrated in diagrams 310 through 350, as already explained with reference to FIG. 2, a load dump due to a cable breakage exists. Points in time 1 through 4 also correspond to one another, so that the explanations with respect to FIG. 2 also apply here.

It is apparent when viewing FIGS. 2 and 3 together, that when the electric machine is not yet extensively de-energized (according to FIG. 3), the vehicle electrical system voltage (see curves 211 and 311 in comparison to one another) at point in time 3 ("second" point in time) still essentially corresponds to the value at point in time 2 ("first" point in time), and that the phase currents (see curves 221 and 321 in comparison to one another) are still significantly higher and in particular at point in time 3 ("second" point in time) have not dropped significantly to a value of essentially 0 A. Furthermore, the voltage applied at the exciter winding (see curves 241 and 341 in comparison to one another) remains stable at a value of less than 0 V when the de-energizing (according to FIG. 3) of the electric machine is not yet extensive. The observation of signal 241 and 341 is therefore also suitable for differentiating the cases from FIGS. 2 and 3, i.e., for answering the question of whether the electric machine is already sufficiently de-energized and therefore it is possible to permanently enter regular rectifier operation again.

As one of the criteria used in the present invention, therefore attention may also be placed on voltage curves 241 and 341 in diagram 240 and 340, of FIGS. 2 and 3. The occurrence of corresponding voltages will be explained further on the basis of FIG. 4, which shows the schematic configuration, identified as a whole with 400, of a voltage regulator of an electric machine, for example, electric machine 101 from FIG. 1, in a schematic view.

A corresponding voltage regulator 400 includes an exciter winding 401 having an inductance of, for example, 400 mH by which a current flow (field current) is typically regulated with the aid of a two-point regulator on the basis of the vehicle electrical system voltage. As soon as the vehicle electrical system voltage applied at a terminal 402 becomes too low or is below a certain threshold, a current control valve 403, for example, a metal oxide field-effect transistor, is activated and therefore switched to be conductive. As illustrated by arrow 404, a current flow results through exciter winding 401. As soon as the voltage at the terminal becomes too high or is above a certain threshold, the activation of current control valve 403 is ended and exciter winding 401 is disconnected from terminal 402. As illustrated by an arrow 405, a freewheeling current from a ground terminal 406 via a diode 407 results therefrom. The field current is reduced in this way.

At a switching point 408, which identifies the connection point between rotor and regulator, the applied voltage (curves 241 and 341 thereof are shown in diagrams 240 and 340 in FIGS. 2 and 3) swings during regular rectifier operation between two values. In freewheeling, corresponding to arrow 405 (i.e., with absent connection of exciter winding 410 to terminal 402), the voltage is at the negative value of the diode voltage of diode 407. In contrast, the voltage is at the value applied at terminal 402, i.e., at the vehicle electrical system voltage, when current control valve 403 is activated and therefore a conductive connection of switching point 408 to terminal 402 exists.

If one again considers curve 241 illustrated in diagram 240 of FIG. 3, it is apparent therefrom that in each case before and after point in time 3 ("second" point in time), the voltage values at switching point 408 (because curve 241 indicates this) deviate from the explained values. This is to be attributed to the fact that at an field current of 0 A through exciter winding 401, switching point 408 is not connected in a low-resistance manner to a voltage potential, but rather only via the large inductance of exciter winding 401 (as mentioned, for example, 400 mH) to ground. Therefore, voltages may easily be induced on the exciter winding. The times in which curve 241 deviates from the regular values correlate precisely with the times in which the field current is 0 A.

In contrast thereto, it is apparent from FIG. 3, in which, as mentioned, a case is shown in which the de-energizing of the electric machine is not yet achieved, that the voltage, apparent from curve 341 in diagram 340, is stable at less than 0 V (i.e., the mentioned negative diode voltage). The observation of a corresponding curve, i.e., the voltage applied at terminal 402, is therefore suitable for differentiating the cases from FIGS. 2 and 3, i.e., as noted, for answering the question of whether the electric machine is already de-energized.

With reference to FIG. 5, a further method will be explained which is also suitable for differentiating the two cases. A known additional circuit is shown, identified in its entirety by 500, of a current control valve 501, for example, a field-effect transistor, in the high-side branch of an active converter (reference is made to following FIG. 8 with respect to details), using which the arresting behavior between points in time 2 and 3 according to FIGS. 2 and 3 ("first" and "second" point in time) may be caused. Additional circuit 500 includes an antiparallel diode 502 and a Zener diode 503, which are situated between gate G and drain D of current control valve 501. The breakdown voltage of Zener diode 503 is selected in such a way that if a defined voltage value is exceeded, a vehicle electrical system voltage applied at terminal 510 breaks down and therefore gate G of current control valve 501 is activated and current control valve 501 is switched to be conductive. By a comparative evaluation of the voltage applied at antiparallel diode 502 with the aid of a comparator 504 and the detection of its output signal at a terminal 505, it may therefore be recognized whether antiparallel diode 502 conducts current and therefore the arresting function is active.

Alternatively thereto, a comparative evaluation of the gate-source voltage may also be carried out using two comparators or amplifiers 506 and 507 and a decoupling resistor 508 (and an evaluation of an output signal at terminal 509). Amplifiers are presumed hereafter which may only amplify positive input voltages and supply 0 V as the output voltage in the case of negative input voltages. Such amplifiers are provided as amplifiers 506 and 507 in the illustrated example.

In the case of an active rectification in the upper converter branch, phase voltage signal 520 is greater than the voltage signal at DC voltage terminal 510 and amplifier 506 supplies a positive signal at the output. As soon as the process has settled, current no longer flows into activation terminal G of current control valve 501 and amplifier 507 does not see a differential voltage at the input, which results in an output signal of approximately 0 V. In the case of active rectification in the lower converter branch, phase voltage signal applied at terminal 520 is close to 0 V, amplifier 506 supplies an output signal at approximately 0 V, as does amplifier 507. In the case of an arrest, i.e., a voltage between terminals 520 and 510 which exceeds the arresting voltage at terminal 503 and the threshold voltage at current control valve 501, amplifier 506 supplies an output voltage of 0 V, while a voltage close to the threshold voltage is set via the arresting path at activation terminal G of current control valve 501. This voltage difference is recognizable at the input of amplifier 507 and at output 509. It may therefore be unambiguously recognized at output 509 whether the circuit is in arresting mode.

A further possible check is illustrated on the basis of FIG. 6, in which curves 601 and 602 of a vehicle electrical system voltage with a (largely) de-energized electric machine (curve 601) and with a not yet or only hardly de-energized electric machine (curve 602) are illustrated. Curves 601 and 602 are plotted in volts on the ordinate in relation to a time in microseconds on the abscissa in a diagram 600. Curves 601 and 602 may be considered to be detail views of curves 211 and 311 according to FIGS. 2 and 3, points in time 2 and 3 are also identified accordingly.

It is apparent that at point in time 3 in the case of the (largely) de-energized electric machine (curve 601), the vehicle electrical system voltage has dropped clearly below the value at point in time 2. In the case of the not yet or only hardly de-energized electric machine (curve 602) in contrast, the value at point in time 3 is still essentially the same as that at point in time 2. Therefore, a differentiation between the two cases may also be carried out on the basis of an evaluation of the vehicle electrical system voltage, as mentioned.

Figure 7:
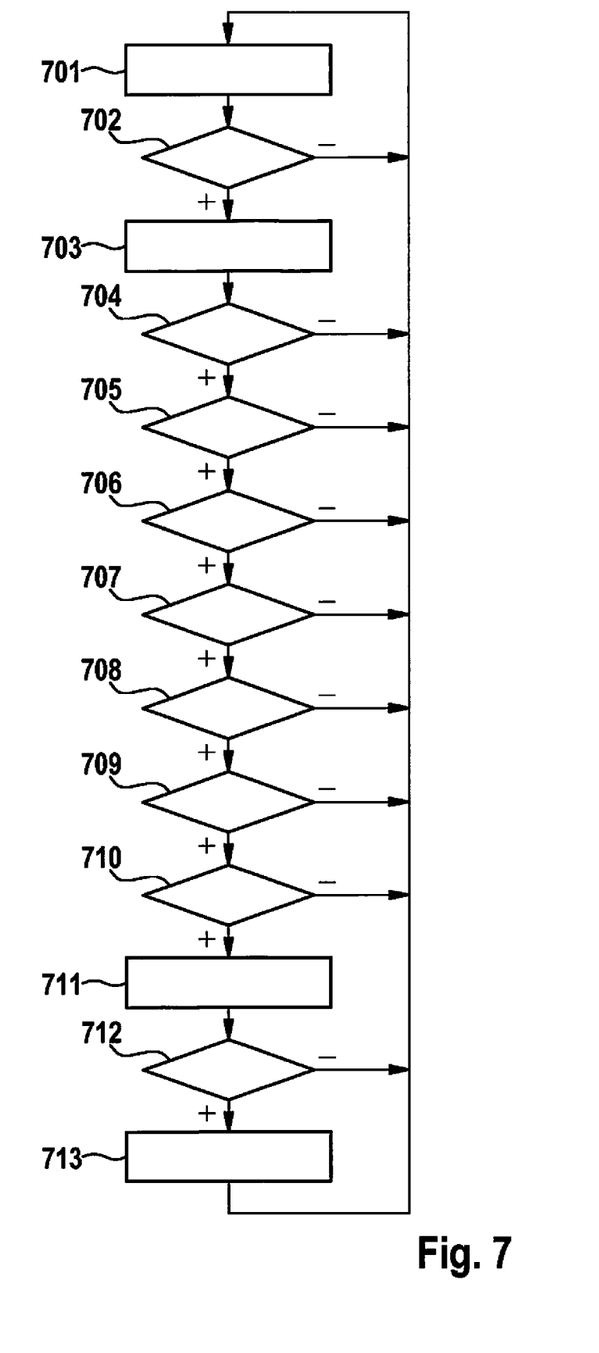
FIG. 7 illustrates a method according to one specific embodiment of the present invention in the form of a schematic flow chart.

A method according to one specific embodiment of the present invention is illustrated in the form of a schematic flow chart in FIG. 7. The method begins in a state illustrated with 701, in which an active converter carries out a regular rectification. If it is recognized in a checking step 702 that a vehicle electrical system voltage has reached a predefined value for activating an arresting function (+), for example, 24 V (referred to within the scope of the present application as the "first" threshold value), a dead time of, for example, 50 µs is initially awaited in a step 703. The beginning of this dead time corresponds to the "first" point in time thus identified within the scope of the present application, and the end of this dead time corresponds to the "second" point in time. For example, an arresting function may be activated between the "first" and "second" points in time (points in time 2 and 3 of the above-explained figures). After the end of the dead time, i.e., at the second point in time, checking steps 704 through 710 are carried out (partially) alternatively and/or (partially) cumulatively. In contrast, if it is recognized in checking step 702 that a vehicle electrical system voltage is not above a predefined value for initiating a phase short-circuit, i.e., for activating a load dump reaction (−), for example, above 24 V, the method is continued with state 701.

In contrast to the illustration of FIG. 7, more or fewer of checking steps 704 through 710 may be provided. For example, checking steps 704 through 710 include the determination of whether at the second point in time, i.e., at the end of the dead time according to step 703, the voltage arresting function, which has been explained multiple times, is still activated and/or the voltage potential has not yet dropped below the first threshold value and/or a value, which characterizes a current flowing through at least one of the phase terminals, is above a third threshold value. Furthermore, checking steps 704 through 710 may include, within the scope of one specific embodiment of the present invention, the determination of whether a supply-side voltage potential applied to an exciter winding of the electric machine (exciter winding 401 according to FIG. 4, terminal 408), is between the voltage potential of the vehicle electrical system voltage and a ground potential when the exciter winding is disconnected from the voltage potential of the vehicle electrical system, and/or a current flowing through the exciter winding is below a corresponding current threshold value and/or after an initial activation of a load dump reaction, after which further load dump reactions were activated, more than a predefined period of time has elapsed and/or more than a predefined number of load dump reactions were activated. If one or more of these conditions are met, a load dump reaction in the form of a phase short-circuit is initiated in a step 711.

As long as it is determined in a checking step 712 that the vehicle electrical system voltage has not yet dropped to a predefined value for the deactivation of the load dump reaction, which is identified here as the "second" threshold value (+), in a step 713, a further dead time of, for example, 50 µs is awaited before the method returns to state 701. Otherwise (−), the method returns directly to state 701. The method also returns directly to state 701, but without a load dump reaction previously being initiated according to step 711, when a negative determination (−) is made in one or in multiple of checking steps 704 through 710.

Figure 8:
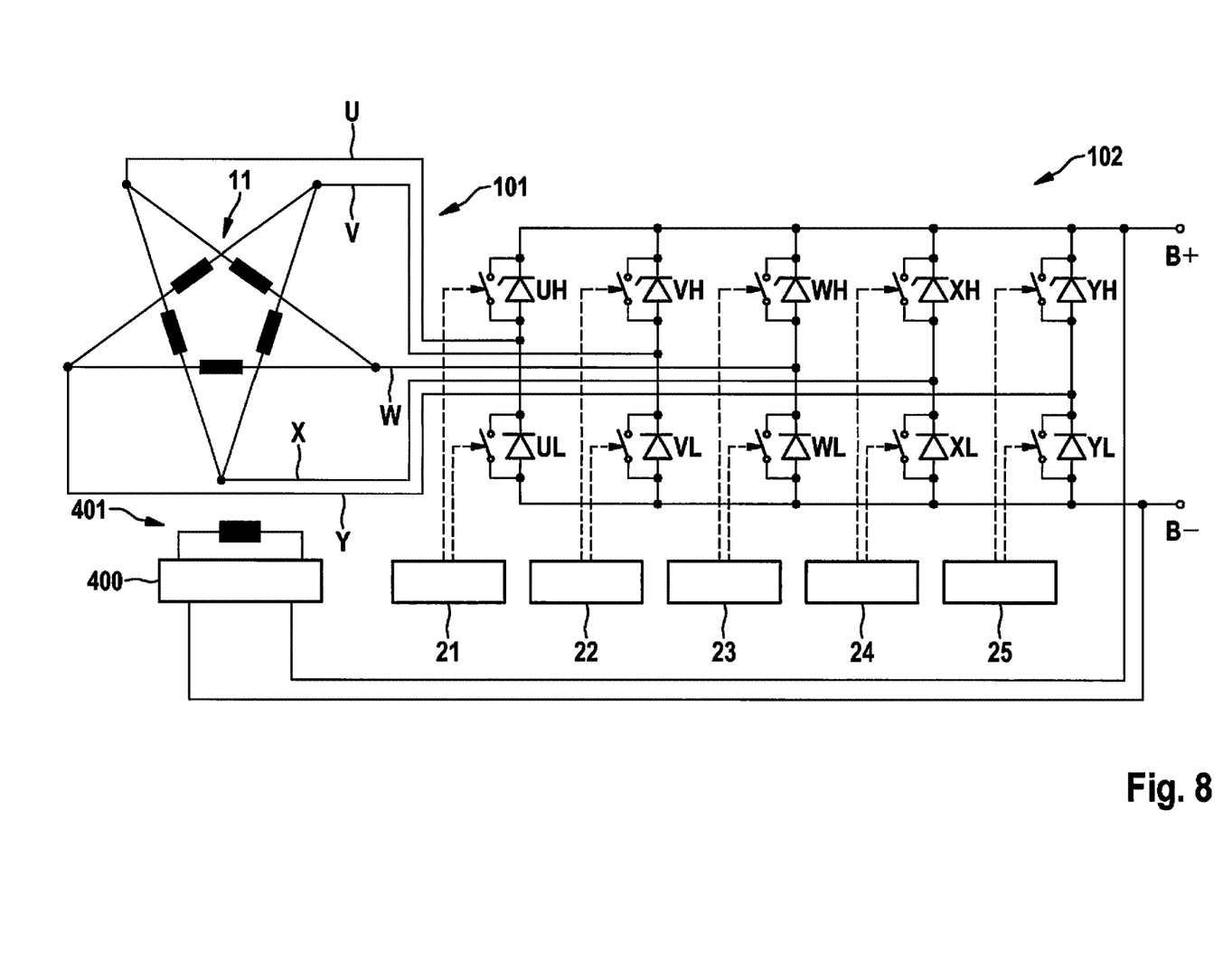
FIG. 8 illustrates an electric machine including an active converter connected thereto in a schematic view.

An electric machine, as identified with reference numeral 101 in FIG. 1, including an active converter 102 connected thereto is schematically illustrated in FIG. 8 for further explanation.

Electric machine 101 includes a five-phase stator 11 configured as a pentagram circuit and a rotor including an exciter winding 401. The individual windings of stator 11 and rotor 12 are not identified separately. A generator regulator, as identified with reference numeral 400 in FIG. 4, evaluates a vehicle electrical system voltage between a first DC voltage terminal B+ and a second DC voltage terminal B− (second DC voltage terminal B− may be at ground) and regulates the output power of electric machine 101, as explained with reference to FIG. 4. First DC voltage terminal B+ therefore corresponds to terminal 402 according to FIG. 4, and the second DC voltage terminal corresponds to terminal 406.

Electric machine 101 is connected via five phase terminals U through Y, each via controllable current control valves, which may be turned on and off, and are identified here with UL through YL and UH through YH, to first DC voltage terminal B+ and second DC voltage terminal B−.

Current control valves UH through YH form an upper rectifier branch ("high-side"); current control valves UL through YL form a lower rectifier branch ("low-side"). Each of current control valves UH through YH may therefore include an additional circuit 500, as illustrated in FIG. 5, and therefore form current control valve 501 illustrated in FIG. 5.

In this case, each of phase terminals U through Y forms a terminal 520 according to FIG. 5 and first DC voltage terminal B+ forms terminal 510 illustrated in FIG. 5.

Controllable current control valves UH through YH, which may be turned on and off, are illustrated in simplified form in FIG. 6 as switches including Zener diodes connected in parallel. The Zener diodes symbolize both the typical breakdown property from a certain drain-source voltage due to a circuit as shown in FIG. 5, for example, or the avalanche voltage, and also the typically provided inverse diode. In lower branch UL through YL, a single diode is shown in each case, since the arresting function is not provided here. As mentioned, instead an arresting function may also be provided in the other branch of the converter; the initiation of phase short-circuits takes place in each case with the aid of the current control valves which are not provided with the arresting function.

Current control valves UH through YH and UL through YL are activatable by particular decentralized control units 21 through 25, as indicated here by dashed activation arrows. Additional circuit 500 illustrated in FIG. 5 may be integrated into control units 21 through 25. A central activation of all current control valves UH through YH and UL through YL may also be provided.

What is claimed is:

1. A method for operating an active converter connected to an electric machine, the method, comprising:
    connecting a number of phase terminals via an activatable current control valve in a first converter branch to a first DC voltage terminal and via an activatable current control valve in a second converter branch to a second DC voltage terminal, each of the current control valves of one of the two converter branches having an arresting circuit; and
    activating, via the arresting circuit, a voltage arresting function from a first point in time, from which a voltage potential applied at the first DC voltage terminal increases up to a predefined first threshold value, and keeping the voltage arresting function active as long as the voltage potential does not drop below the first threshold value, the voltage arresting function including activating the current control valves having the arresting circuit and thereby establishing a conductive connection between the phase terminal connected to this current control valve and the particular DC voltage terminal;
    wherein the converter is configured to only activate a load dump reaction upon activation conditions from a second point in time if the voltage potential is above a second threshold value at the second point in time, the second point in time being after the first point in time and the second threshold value being below the first threshold value and the load dump reaction including activating all current control valves of the other of the two converter branches and thereby establishing a conductive connection between all phase terminals, and
    wherein the activation conditions include the condition that it is determined that at the second point in time, a supply-side voltage potential applied to an exciter winding of the electric machine is between the voltage potential applied at the first DC voltage terminal and a ground potential if the exciter winding is disconnected from the voltage potential of the vehicle electrical system voltage and/or a current flowing through the exciter winding is below a current threshold value and/or after an initial activation of a load dump reaction, after which further load dump reactions were activated, more than a predefined period of time has elapsed and/or more than a predefined number of load dump reactions were activated.

2. The method of claim 1, wherein a generator regulator is used, in which the exciter winding is connected via at least one activatable current control valve to the DC voltage terminal, and the determination at the second point in time that the supply-side voltage potential applied to the exciter winding of the electric machine is between the voltage potential applied at the first DC voltage terminal and a ground potential, if the exciter winding is disconnected from the voltage potential of the vehicle electrical system voltage, includes the determination that the at least one current control valve, via which the exciter winding is connected to the DC voltage terminal, is not activated.

3. The method of claim 1, wherein the determination that the current flowing through the exciter winding is below a current threshold value includes the measurement of the current with the aid of a current measuring device and the comparison to the current threshold value.

4. The method of claim 3, wherein the current threshold value is determined on the basis of a speed and taking into consideration of thermal and/or electrical properties of the electric machine.

5. The method of claim 1, wherein the determination at the second point in time of whether after the initial activation of a load dump reaction, after which further load dump reactions were activated, more than a predefined period of time has elapsed, includes specifying a minimum and/or maximum number of activations of load dump reactions and/or a minimum and/or maximum time interval between successive activations of load dump reactions, and only determining that after the initial activation of a load dump reaction, after which further load dump reactions were activated, more than a predefined period of time has elapsed, if at least one of these provided specifications is fulfilled.

6. The method of claim 1, wherein the predefined number of load dump reactions is predefined based on a number of load dump reactions determined in the event of a load dump due to a shutdown of a consumer.

7. The method of claim 1, wherein a counter is used, which counts a number of load dump reactions at least during a predefined period of time.

8. A processor coupled to memory for operating an active converter connected to an electric machine, comprising:
    a processing arrangement configured to perform the following:
    connecting a number of phase terminals via an activatable current control valve in a first converter branch to a first DC voltage terminal and via an activatable current control valve in a second converter branch to a second DC voltage terminal, each of the current control valves of one of the two converter branches having an arresting circuit; and
    activating, via the arresting circuit, a voltage arresting function from a first point in time, from which a voltage potential applied at the first DC voltage terminal increases up to a predefined first threshold value, and keeping the voltage arresting function active as long as the voltage potential does not drop below the first threshold value, the voltage arresting function including activating the current control valves having the arresting circuit and thereby establishing a conductive connection between the phase terminal connected to this current control valve and the particular DC voltage terminal;

wherein the converter is configured to only activate a load dump reaction upon activation conditions from a second point in time if the voltage potential is above a second threshold value at the second point in time, the second point in time being after the first point in time and the second threshold value being below the first threshold value and the load dump reaction including activating all current control valves of the other of the two converter branches and thereby establishing a conductive connection between all phase terminals, and wherein the activation conditions include the condition that it is determined that at the second point in time, a supply-side voltage potential applied to an exciter winding of the electric machine is between the voltage potential applied at the first DC voltage terminal and a ground potential if the exciter winding is disconnected from the voltage potential of the vehicle electrical system voltage and/or a current flowing through the exciter winding is below a current threshold value and/or after an initial activation of a load dump reaction, after which further load dump reactions were activated, more than a predefined period of time has elapsed and/or more than a predefined number of load dump reactions were activated.

9. A non-transitory computer readable medium having a computer program, which is executable by a processor, comprising:

a program code arrangement having program code for operating an active converter connected to an electric machine, by performing the following:

connecting a number of phase terminals via an activatable current control valve in a first converter branch to a first DC voltage terminal and via an activatable current control valve in a second converter branch to a second DC voltage terminal, each of the current control valves of one of the two converter branches having an arresting circuit; and activating, via the arresting circuit, a voltage arresting function from a first point in time, from which a voltage potential applied at the first DC voltage terminal increases up to a predefined first threshold value, and keeping the voltage arresting function active as long as the voltage potential does not drop below the first threshold value, the voltage arresting function including activating the current control valves having the arresting circuit and thereby establishing a conductive connection between the phase terminal connected to this current control valve and the particular DC voltage terminal;

wherein the converter is configured to only activate a load dump reaction upon activation conditions from a second point in time if the voltage potential is above a second threshold value at the second point in time, the second point in time being after the first point in time and the second threshold value being below the first threshold value and the load dump reaction including activating all current control valves of the other of the two converter branches and thereby establishing a conductive connection between all phase terminals, and wherein the activation conditions include the condition that it is determined that at the second point in time, a supply-side voltage potential applied to an exciter winding of the electric machine is between the voltage potential applied at the first DC voltage terminal and a ground potential if the exciter winding is disconnected from the voltage potential of the vehicle electrical system voltage and/or a current flowing through the exciter winding is below a current threshold value and/or after an initial activation of a load dump reaction, after which further load dump reactions were activated, more than a predefined period of time has elapsed and/or more than a predefined number of load dump reactions were activated.

10. The computer readable medium of claim 9, wherein a generator regulator is used, in which the exciter winding is connected via at least one activatable current control valve to the DC voltage terminal, and the determination at the second point in time that the supply-side voltage potential applied to the exciter winding of the electric machine is between the voltage potential applied at the first DC voltage terminal and a ground potential, if the exciter winding is disconnected from the voltage potential of the vehicle electrical system voltage, includes the determination that the at least one current control valve, via which the exciter winding is connected to the DC voltage terminal, is not activated.

* * * * *